United States Patent
Li et al.

(10) Patent No.: US 9,087,086 B1
(45) Date of Patent: Jul. 21, 2015

(54) METHOD AND SYSTEM FOR HANDLING OBJECT BOUNDARIES OF A DATA STREAM TO OPTIMIZE DEDUPLICATION

(71) Applicant: EMC Corporation, Hopkinton, MA (US)

(72) Inventors: Junxu Li, Pleasanton, CA (US); Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 251 days.

(21) Appl. No.: 13/718,827

(22) Filed: Dec. 18, 2012

(51) Int. Cl.
*G06F 17/00* (2006.01)
*G06F 17/30* (2006.01)

(52) U.S. Cl.
CPC .... *G06F 17/30303* (2013.01); *G06F 17/30156* (2013.01); *G06F 17/30159* (2013.01)

(58) Field of Classification Search
CPC .............. G06F 17/30156; G06F 17/30159; G06F 17/30303
USPC ......................... 707/664, 692, 693
See application file for complete search history.

(56) References Cited

U.S. PATENT DOCUMENTS

| | | | |
|---|---|---|---|
| 5,191,645 A * | 3/1993 | Carlucci et al. ............ 715/723 |
| 5,321,500 A * | 6/1994 | Capitant et al. ............ 348/97 |
| 7,296,240 B1 * | 11/2007 | Yalovsky et al. ........... 715/770 |
| 7,818,535 B1 | 10/2010 | Bono et al. |
| 8,315,985 B1 * | 11/2012 | Ohr et al. .................... 707/664 |
| 8,868,520 B1 | 10/2014 | Raghuwanshi et al. |
| 2004/0117499 A1 * | 6/2004 | Liu et al. ..................... 709/231 |
| 2008/0294696 A1 * | 11/2008 | Frandzel .................... 707/200 |
| 2009/0171888 A1 * | 7/2009 | Anglin .......................... 707/2 |
| 2009/0271454 A1 | 10/2009 | Anglin et al. |
| 2011/0099154 A1 | 4/2011 | Maydew et al. |
| 2011/0167221 A1 | 7/2011 | Pangal et al. |
| 2011/0191533 A1 | 8/2011 | Coulter |
| 2011/0298979 A1 | 12/2011 | Strein et al. |
| 2012/0173822 A1 | 7/2012 | Testardi et al. |
| 2013/0060739 A1 * | 3/2013 | Kalach et al. ............... 707/692 |
| 2013/0151802 A1 * | 6/2013 | Bahadure et al. ........... 711/162 |
| 2014/0095439 A1 * | 4/2014 | Ram ........................... 707/640 |

OTHER PUBLICATIONS

Non-Final Office Action, U.S. Appl. No. 13/718,824, dated Nov. 12, 2014, 8 pages.

* cited by examiner

*Primary Examiner* — Phong Nguyen
(74) *Attorney, Agent, or Firm* — Blakely, Sokoloff, Taylor & Zafman LLP

(57) ABSTRACT

Techniques for deduplicating a data stream based on boundary markers embedded therein are described. According to one embodiment, a data stream is received from a client having a sequence of a plurality of data objects, where to data stream represents a file or a directory of one or more files of a file system associated with the client. In response, the data stream is deduplicated into a plurality of deduplicated chunks in view of boundaries of the data objects.

18 Claims, 11 Drawing Sheets

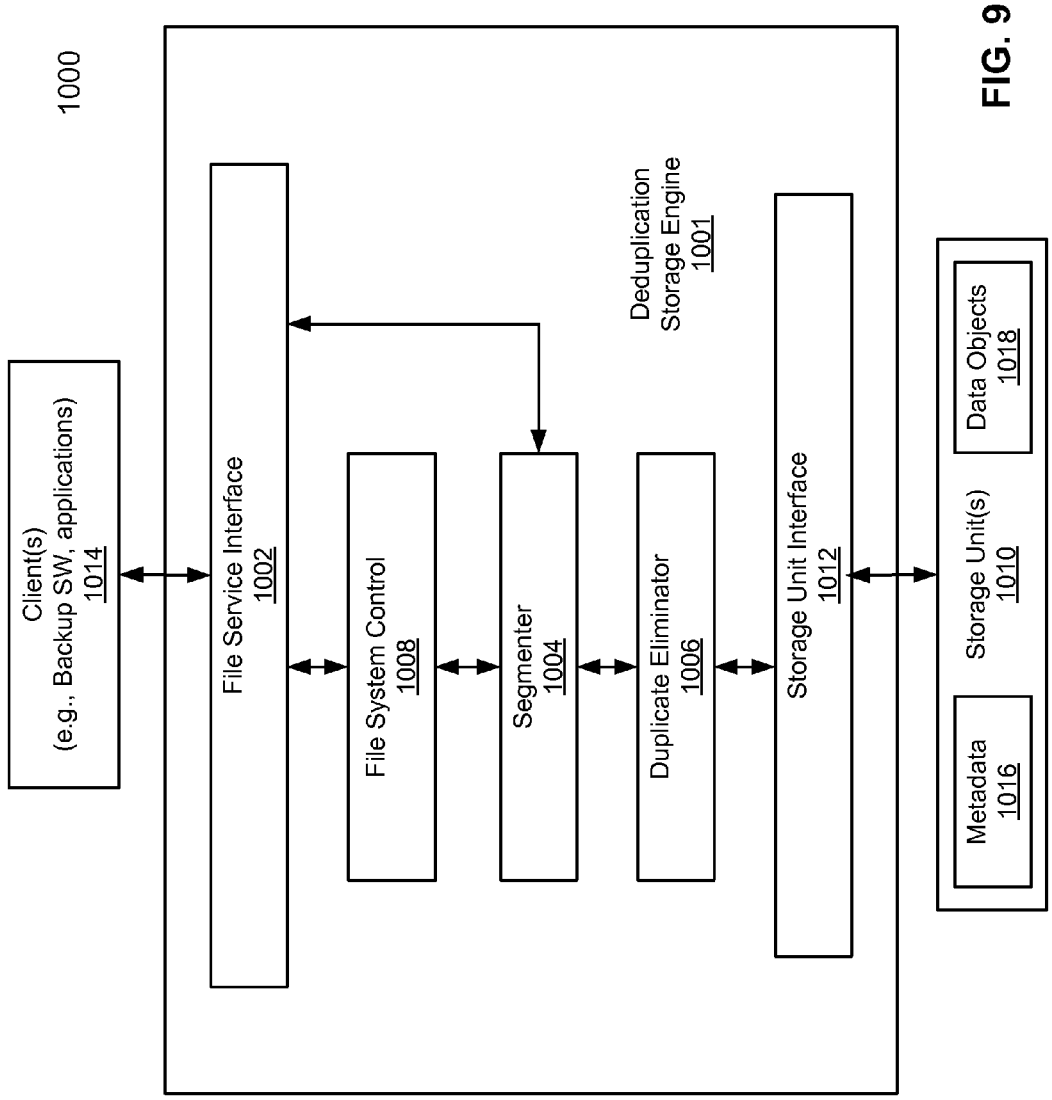

METHOD AND SYSTEM FOR HANDLING OBJECT BOUNDARIES OF A DATA STREAM TO OPTIMIZE DEDUPLICATION

RELATED APPLICATIONS

This application is related to co-pending U.S. patent application Ser. No. 13/718,824, entitled "Method and System for Handling Checksum of a Data Stream to Optimize Deduplication," filed Dec. 18, 2012.

FIELD OF THE INVENTION

Embodiments of the present invention relate generally to data storage systems. More particularly, embodiments of the invention relate to handling object boundaries of a data stream to optimize data for better deduplication.

BACKGROUND

Data storage utilization is continually increasing, causing the proliferation of storage systems in data centers. In order to reduce storage space of a storage system, deduplication techniques are utilized, where data objects or files are segmented in chunks and only the deduplicated chunks are stored in the storage system.

At the time of data recovery by clients, there is a need to validate data integrity as data are read back from a storage system (e.g., backup storage system). Some data would include integrity verification data such as checksum data inside the data stream for data integrity verification during the restoration. However, such integrity verification data may cause seriously degraded deduplication of the actual data stream at the storage system. Such data integrity check should survive backup data migration among different tiers of storage, while its operation efficiency should be guaranteed with random data access and deduplication effectiveness at the storage systems preserved.

In addition, a data stream such as a backup data stream typically consists of a sequence of data objects or files. Typically, storage systems are unaware of individual file boundaries that can be used as heuristics for segmentation, thus segmentation boundaries tend to randomize across file boundaries. As a result, such a configuration would affect performance and/or deduplication effectiveness, because a file is often represented and accessed as a whole unit during backup and synthetic operations.

BRIEF DESCRIPTION OF THE DRAWINGS

Embodiments of the invention are illustrated by way of example and not limitation in the figures of the accompanying drawings in which like references indicate similar elements.

FIG. 9 is a block diagram illustrating a deduplicated storage system according to one embodiment of the invention.

DETAILED DESCRIPTION

Figure 1:
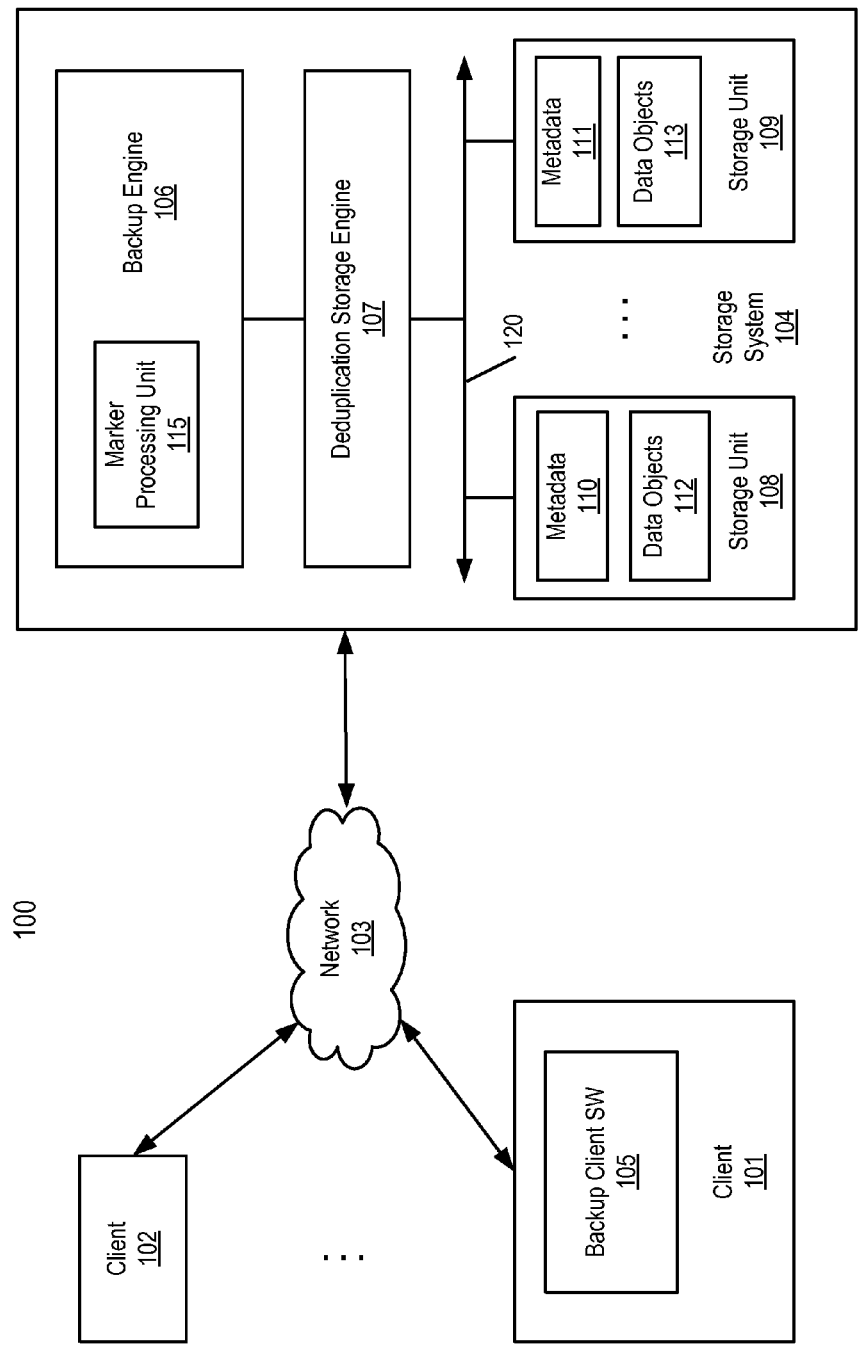
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, storage software (e.g., backup software) is equipped with knowledge about the structure and nature of the data being stored. Such application specific knowledge can provide important heuristics for backend storage processing such as deduplication processing. In one embodiment, special markers are embedded into a data stream (e.g., backup data stream) to transfer such data specific knowledge to backend storage systems to be recognized by the storage systems. As a result, certain optimization processes can be performed during storage processes such as deduplication processes, while maintaining desired functionality for the clients.

In one embodiment, checksum markers are embedded in a data stream that includes multiple data regions. Each checksum marker is associated with each of the data regions and each checksum marker includes or identifies a checksum within the data stream for verifying the integrity of the corresponding data region. The checksum markers may be inserted into the data stream by a client (e.g., backup software client) interleaving with the corresponding data regions. The data stream is then transmitted to a remote storage system (e.g., backend storage system such as a backup storage system) for storage. The checksum markers may be utilized for verifying the integrity of the data regions subsequently when the data stream is restored from the remote storage system. When the storage system receives the data stream having checksum markers therein, the storage system parses the data stream to recognize or identify the checksum markers and to remove the checksum markers from the data stream. The data stream having the checksum markers removed is then deduplicated to generate deduplicated chunks (also referred to as deduplicated segments). The deduplicated chunks are then stored in the storage system. In addition, the checksum markers are separately stored, which may be used to reconstruct the data stream subsequently during the restoration. As a result, the checksums of the data regions within the data stream would not significantly affect the deduplication efficiency.

According to another embodiment, another type of markers is utilized to identify boundaries of data objects within the data stream. When the storage system is to perform a deduplication process, the storage system can segment the data stream into segments using a chunking algorithm. When segmenting the data stream, the storage system can recognize the boundary markers and take the data object boundaries into the consideration in deciding where to anchor the data stream. As a result, a better deduplication and data access efficiency can be achieved. Both the checksum markers and boundary markers can be utilized individually or in combination within a data stream.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as the Internet, or a combination thereof.

Storage system 104 may represent any type of server or cluster of servers. For example, storage system 104 may be a storage server used for any of various different purposes, such as to provide users with access to shared data and/or to back up data such as mission critical data. In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. Backup engine 106 is configured to back up data of clients 101-102 and to store the backup files in storage units 108-109.

In response to a data file, for example, received from backup engine 106, to be stored in storage units 108-109, according to one embodiment, deduplication storage engine 107 is configured to segment the data file into multiple chunks (also referred to as segments) according to a variety of segmentation policies or rules. For example, a file may be broken into chunks by identifying chunk boundaries using a content-based technique. In one particular embodiment, a function is calculated at various locations of a file, when the function is equal to a value or when the value is a minimum, a maximum, or other value relative to other function values calculated for the file. Alternatively, a file may be segmented into chunks by identifying chunk boundaries using a non-content-based technique (e.g., based on size of the chunk). In one embodiment, a chunk is restricted to a minimum and/or maximum length, to a minimum or maximum number of chunks per file, or any other appropriate limitation. Deduplication storage engine 107 may choose not to store a chunk in a storage unit if the chunk has been previously stored in storage units 108-109. In the event that deduplication storage engine 107 chooses not to store the chunk in storage units 108-109, it stores metadata associated with the chunk to enable the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

According to one embodiment, backup engine 106 includes a marker processing unit 115 to process markers of a backup stream received from clients 101-102. In one embodiment, marker processing unit 115 is to recognize the markers marking certain data, such as checksum data or data object boundaries within the backup stream. Once the markers have been recognized, the associated data is identified based on the markers. For example, the size or a boundary of checksum data or a data region may be determined based on the markers. The markers and/or associated data (e.g., the actual checksum data) may be extracted or removed from the data stream. The remaining data stream (without the markers and/or the associated data) may be deduplicated by deduplication storage engine 107 into deduplicated data chunks in view of the information provided by the markers. The deduplicated data chunks are then stored in any of storage units 108-109 as part of data objects 112-113. The markers and/or the associated data may also be separately stored in storage units 108-109. In one embodiment, the markers and/or associated data may be inserted into the backup stream at the client prior to transmitting the backup stream to storage system 104.

For example, a backup stream may be generated by backup client software 105 of client 101 in response to a request for backing up data stored in client 101. The backup stream may represent a file or a directory of one or more files or subdirectories, dependent upon the specific backup policy or schedule. In addition, when generating the data stream, backup client software 105 is to insert markers and/or associated checksum data into the data stream prior to transmitting the data stream to storage system 104, where the markers will be recognized by marker processing unit 115 to perform additional processes based on the information provided by the markers.

Figure 2:
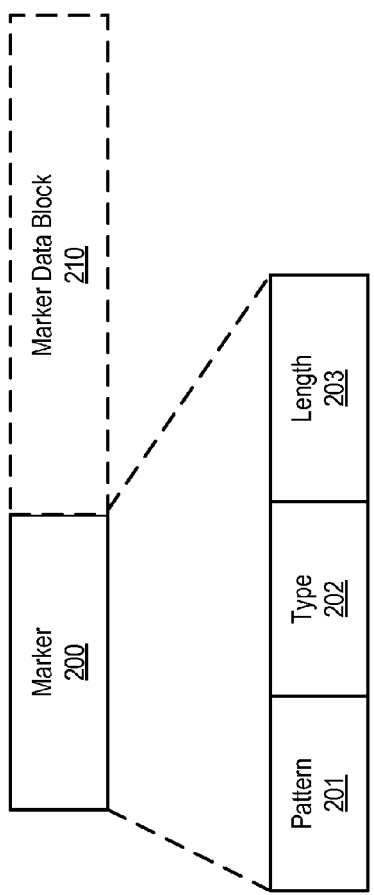
FIG. 2 a block diagram illustrating a marker data structure according to one embodiment of the invention.

In one embodiment, a data stream includes multiple data regions (e.g., fixed-size regions). When a data stream is being formed, client software 105 is to generate a checksum for each data region and insert a checksum marker (also referred to as a marker header) in front of each checksum data block to identify the corresponding checksum data block. According to one embodiment, a marker header includes a predetermined pattern (signature) and a length identifying a size of the marker data block following the marker header, as shown in FIG. 2. According to another embodiment, client software 105 may also identify the boundaries of the data regions and insert boundary markers into the data stream during the construction of the data stream. Note that although not shown, the architecture of clients 101-102 may be identical or similar. Client 102 may also include backup client software and its corresponding marking unit running therein.

When the backup stream is received by backup engine 106 from backup client software 105, marker processing unit 115 of backup engine 106 is to scan the backup stream to recognize the markers inserted by client software 105 to identify the corresponding marker. During the construction of a backup stream, the backup stream may be partitioned into multiple data regions by client software 105. A checksum is generated for each region and a checksum marker is inserted into the backup stream to be associated with the corresponding data region for the purpose of verifying integrity of the corresponding data region. In addition, client software 105 further inserts a checksum marker to identify the checksum for each data region.

The checksum markers may be utilized for verifying the integrity of the data regions subsequently when the data stream is restored from the remote storage system. When the storage system 104 receives the data stream having checksum markers therein, marker processing unit 115 parses the data stream to recognize or identify the checksum markers and to remove the checksum markers and/or the associated checksum data from the data stream. The data stream having the checksum markers removed is then deduplicated by deduplication storage engine 107 to generate deduplicated chunks (also referred to as deduplicated segments). The deduplicated chunks are then stored in storage units 108-109 of storage system 104. In addition, the checksum markers are separately stored, which may be used to reconstruct the data stream subsequently during the restoration. As a result, the checksums of the data regions within the data stream would not significantly affect the deduplication efficiency.

According to another embodiment, another type of marker is utilized to identify boundaries of data objects within the data stream. When deduplication storage engine 107 is to perform a deduplication process, deduplication storage engine 107 can segment the data stream into segments using a chunking algorithm. When segmenting the data stream, deduplication storage engine 107 can recognize the boundary markers and take the data object boundaries into the consideration in deciding where to anchor the data stream for the purpose of segmenting the data stream into deduplicated chunks. As a result, a better deduplication and data access efficiency can be achieved. Both the checksum markers and boundary markers can be utilized individually or in combination within a data stream.

Note that marker processing unit 115 may be implemented as a standalone processing unit communicatively coupled to backup engine 106 and/or deduplication storage engine 107. In this example, storage system 104 operates as a backup server. In another configuration, storage system 104 may operate as a non-backup system, such as, for example, a regular file server. When storage system 104 operates as a regular storage system, marker processing unit 115 can be coupled to an interface, such as a file system interface, a Web interface, an application programming interface (API), etc., to receive a file or files from clients 101-102 to be stored in storage units 108-109. Other configurations may also exist.

FIG. 2 is a block diagram illustrating an example of a marker data structure according to one embodiment. According to one embodiment, marker 200 includes a pattern field 201, a type of marker field 202, and a length field 203. Pattern field 201 is used by processing logic to recognize that this is a marker the processing logic is responsible for processing. Type field 202 is used to identify the type of the marker, such as, for example, a checksum marker or a boundary marker, and it can be used to identify other types of markers. Length field 203 is used to specify the size of the data block 210 (e.g., checksum data) that follows marker 200. For example, type 202 of a checksum marker stores a value indicating that the corresponding marker is a checksum marker and data block 210 contains the actual checksum data. Similarly, type 202 of a boundary marker stores a different value indicating that the corresponding marker is a boundary marker. A boundary marker may have a zero value in length field 203 and it does not have marker data block 210 as a result. Note that pattern field 201 and type field 202 may be a single field to identify the marker. In one embodiment, type field 202 stores a large integer to represent a particular marker. In one particular embodiment, the large integer may be a square of a large prime number. Other integer numbers may also be utilized.

Figure 3:
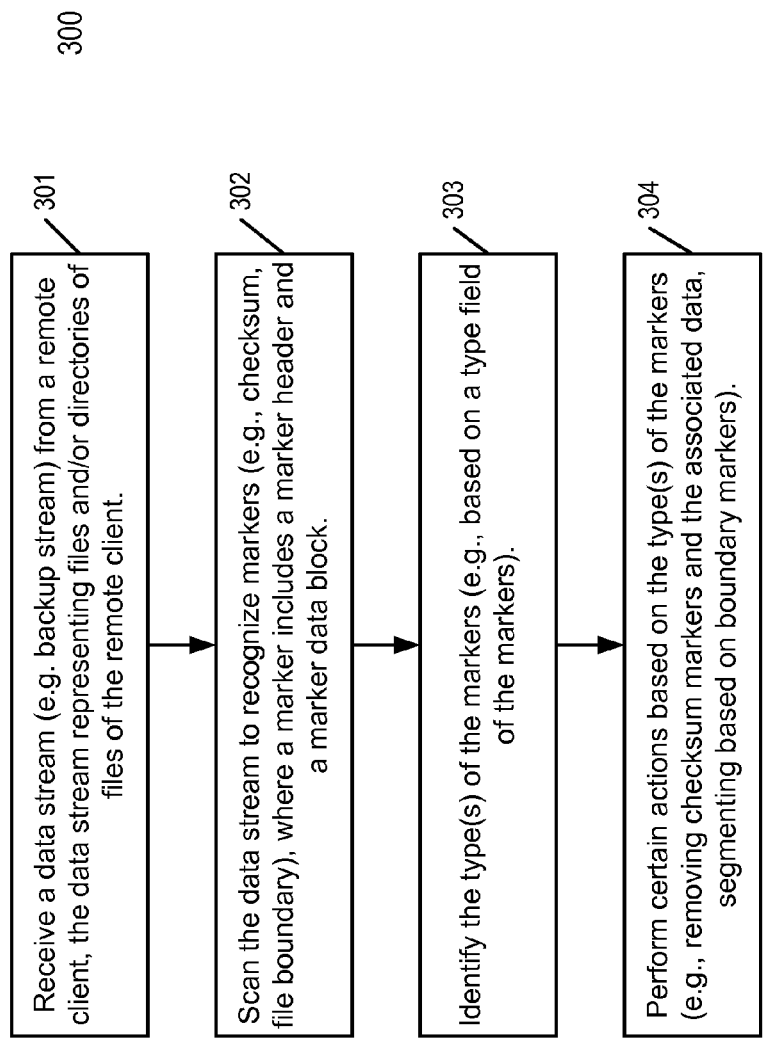
FIG. 3 is a flow diagram illustrating a method for deduplication according to one embodiment of the invention.

FIG. 3 is a flow diagram illustrating a method for improving deduplication using markers according to one embodiment of the invention. Method 300 may be performed by marker processing unit 115 of FIG. 1, which may be processing logic implemented in software, hardware, or a combination thereof. Referring to FIG. 3, at block 301, processing logic receives a data stream such as a backup stream from a remote client. The data stream may represent at least a portion of files or directories of files of the client. At block 302, processing logic scans the data stream to recognize one or more markers (e.g., checksum markers or boundary markers) embedded therein, where the markers may be inserted into the data stream by the client. As described above, a marker may include a marker header having a marker type field identifying a type of the marker as shown in FIG. 2. At block 303, processing logic identifies type(s) of the markers, for example, based on a type field of the markers. At block 304, certain actions associated with the identified type(s) of the markers are performed. For example, processing logic may remove the checksum markers from the data stream prior to the deduplication. However, dependent upon the specific circumstances, for some types of markers such as boundary markers that would not have a significant impact on the deduplication efficiency, there is no need to remove them from the data stream. Thereafter, the data stream is deduplicated into deduplicated chunks in view of the information provided by the markers. The deduplicated chunks and the removed markers may be separately stored in the storage.

Figure 4:
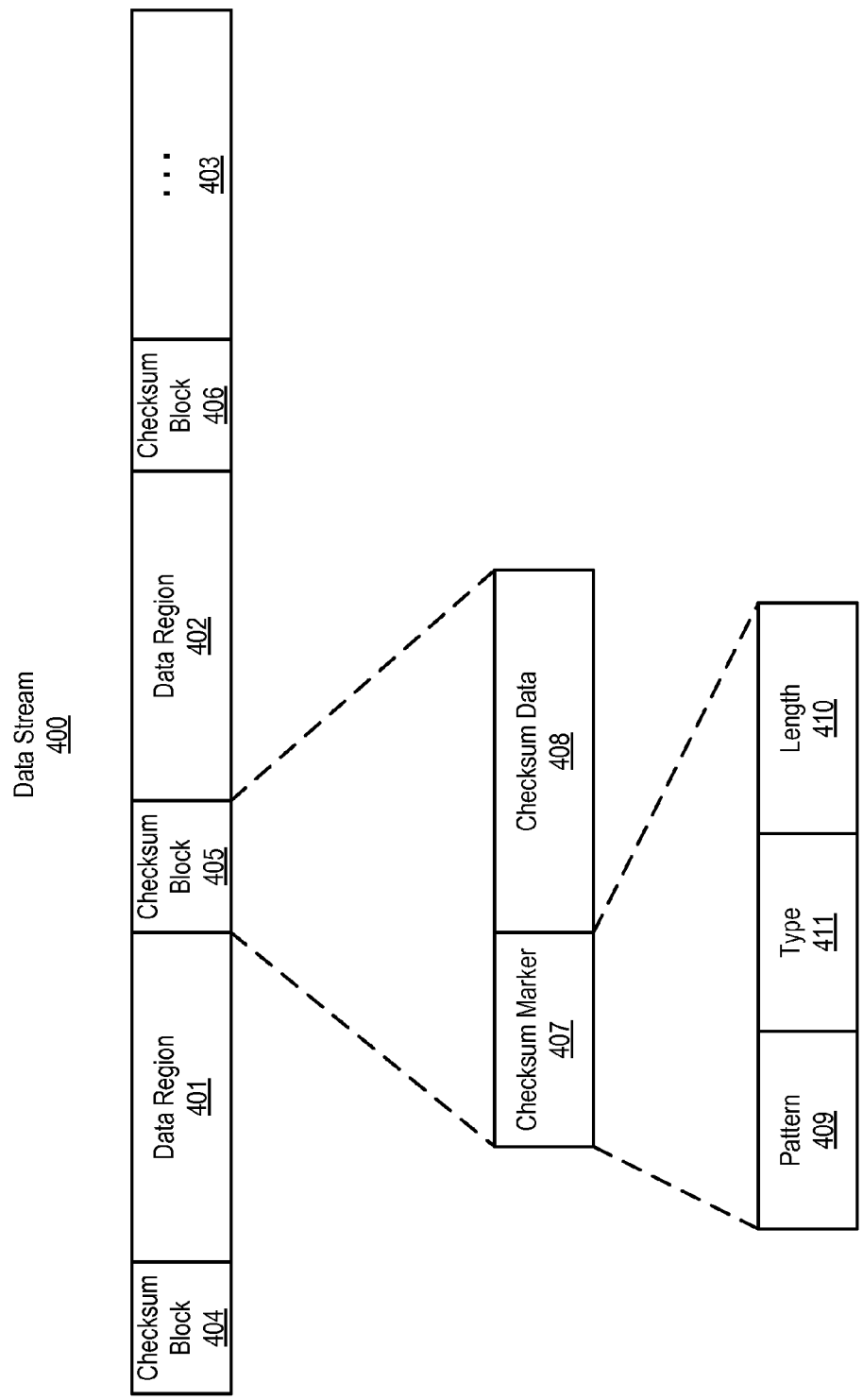
FIG. 4 is a block diagram illustrating an example of a data stream having markers embedded therein according to one embodiment of the invention.

FIG. 4 is a block diagram illustrating an example of a data stream having markers embedded therein according to one embodiment of the invention. For example, data stream 200 may represent a backup stream generated by backup client software 105 and processed by backup engine 106 of FIG. 1. Referring to FIG. 4, data stream 400 includes data regions 401-403, each data region being associated with one of checksum blocks 404-406 for verifying integrity of the corresponding data region. Note that locations and format of checksum blocks 404-406 may vary dependent upon the specific file systems or operating systems they are associated with. According to one embodiment, a checksum block, in this example checksum block 405, includes a checksum marker in a form of checksum marker or header 407 and checksum data 408. Checksum marker 407 may be inserted by a client such as client software 105. For example, when generating data stream 400, client software 105 calculates and inserts checksum data 408 into data stream 400. In addition, for each checksum inserted, client software 105 also inserts checksum marker 407, for example, in front of checksum data 408.

According to one embodiment, a checksum marker, in this example checksum marker 407, includes a checksum pattern 409 and a length 410. Checksum pattern 409 includes a predetermined pattern that can be used to identify checksum data 408. Length 410 specifies the size of checksum data 408. As a result, when the marker processing unit scans data stream 400, it can recognize checksum marker 407 based on its checksum pattern 409 and determine the size of checksum data 408 based on length 410. Checksum marker 407 can be implemented in a variety of data structures.

Figure 5:
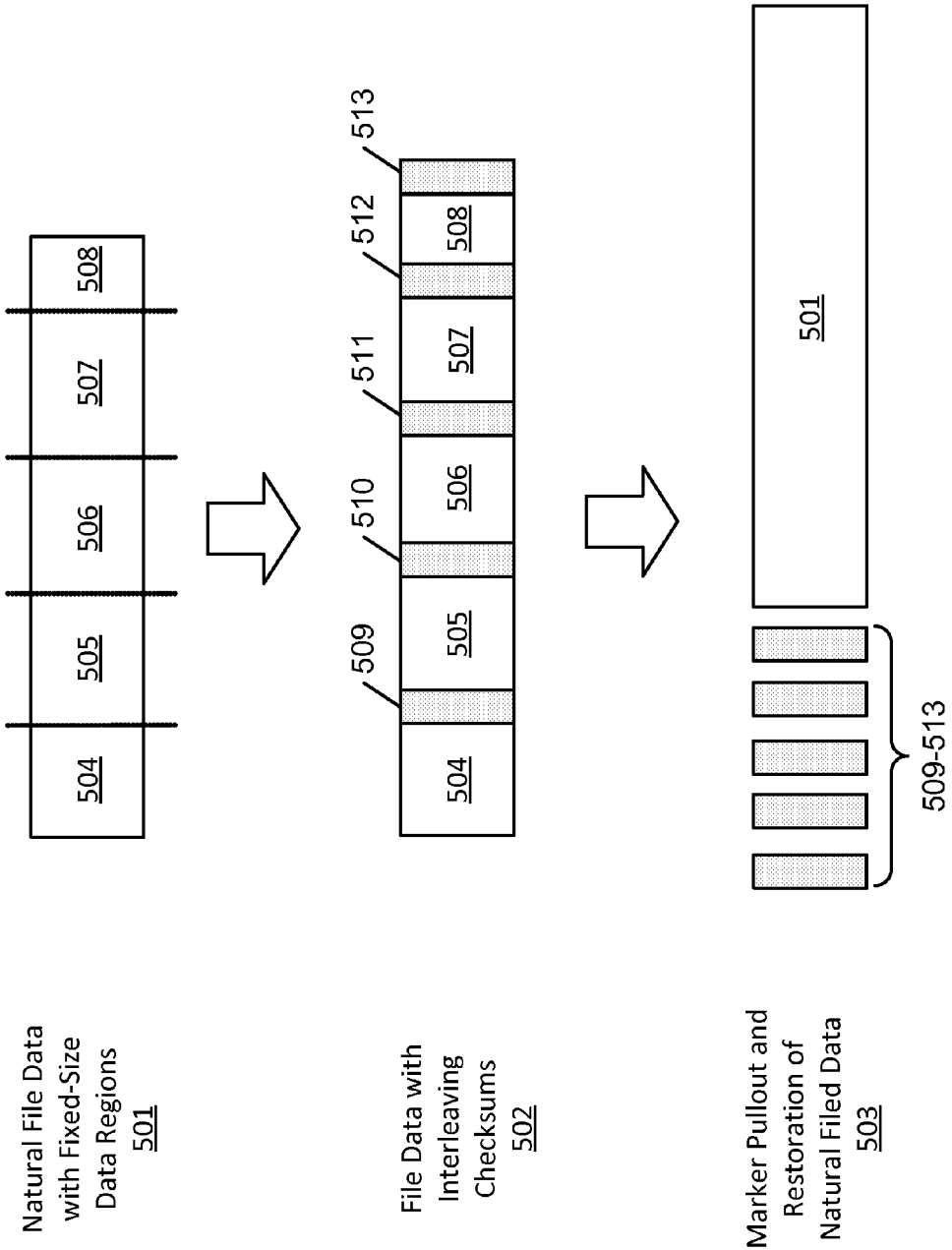
FIG. 5 is a block diagram illustrating a process of handling checksum markers according to one embodiment of the invention.

FIG. 5 is a block diagram illustrating a process of handling checksum markers according to one embodiment of the invention. Referring to FIG. 5, as first data stream 501 is read from a storage at a backup client for deduplication storage, first data stream 501 is partitioned into data regions 504-508 using a partitioning method (e.g., fixed-size partitioning) to calculate a checksum for each of the data regions. Then a checksum marker followed by checksum data, represented by checksum blocks 509-513, is appended to each of the data regions 504-508. The process repeats until all data are processed, which forms a second data stream 502 with interleaving checksum blocks 509-513. Second data stream 502 is then transmitted from the client to a remote storage for deduplication. The storage system can then recognize the checksum markers embedded within checksum blocks 509-513 and pull those markers and checksum data out of data stream 502 to recover the original data stream 501, where the original data stream 501 is then deduplicated, where checksum blocks 509-513 may be separately stored.

A checksum or hash sum is a fixed-size datum computed from an arbitrary block of digital data for the purpose of detecting accidental errors that may have been introduced during its transmission or storage. The integrity of the data can be checked at any later time by recomputing the checksum and comparing it with the stored one. If the checksums match, the data was likely not accidentally altered. The procedure that yields the checksum from the data is called a checksum function or checksum algorithm. A good checksum algorithm will yield a different result with high probability when the data is accidentally corrupted; if the checksums match, the data has the same high probability of being free of accidental errors.

Figure 6A:
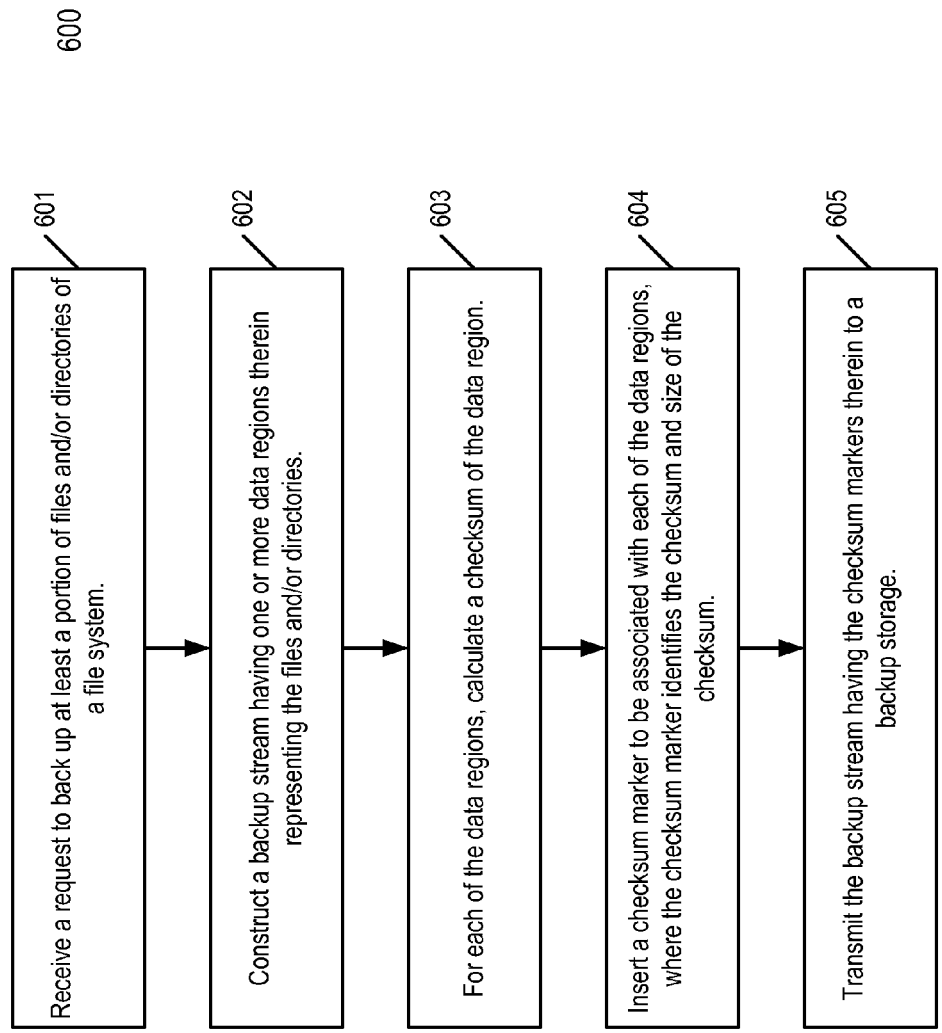
FIGS. 6A and 6B are flow diagrams illustrating a method for processing checksum markers according to certain embodiments of the invention.

FIG. 6A is a flow diagram illustrating a method for processing checksum markers according to one embodiment of the invention. Method 600 may be performed by client software 105 of FIG. 1. Referring to FIG. 6, at block 601, processing logic receives a request for backing up at least a portion of files and/or directories of files of a file system. At block 602, processing logic constructs a backup stream having one or more data regions therein. At block 603, for each of the data region, a checksum is calculated. At block 604, for each of the checksums, a checksum marker is inserted into the backup stream to be associated with each of the data regions. At block 605, the backup stream is then transmitted to a backup storage.

Figure 6B:
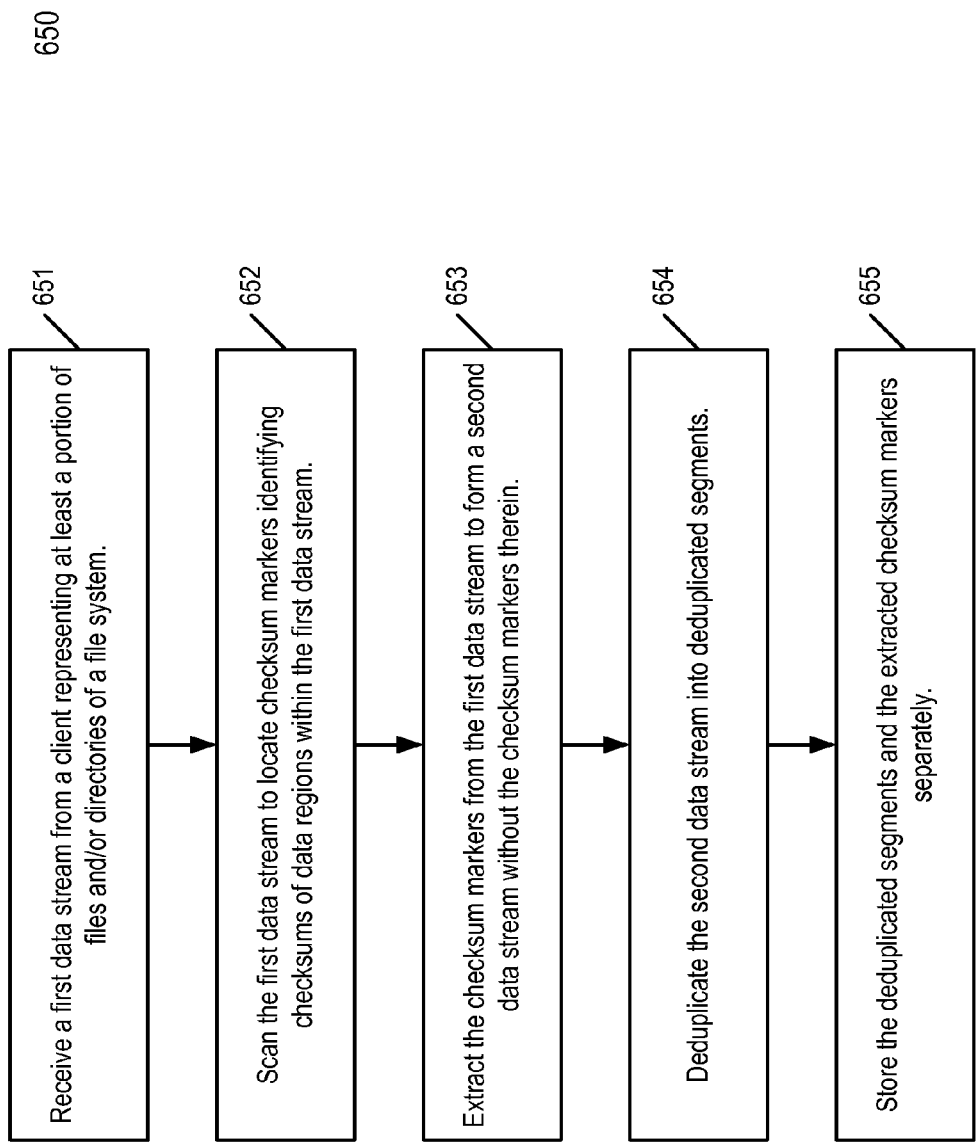

FIG. 6B is a flow diagram illustrating a method for processing checksum markers according to another embodiment of the invention. Method 650 may be performed by marker processing unit 115 of FIG. 1. Referring to FIG. 6B, at block 651, processing logic receives a first data stream from a remote client representing at least a portion of files of the client. At block 652, processing logic scans the first data stream to locate checksum markers that identify the checksums of data regions within the first data stream. At block 653, processing logic extracts the checksum markers and the associated checksums from the first data stream to form a second data stream that is without the checksum markers and the checksums. At block 604, the second data stream is deduplicated into deduplicated chunks. At block 605, the deduplicated chunks, as well as the checksum markers and checksums, are stored separately.

As described above, a backup data stream typically consists of a sequence of data objects such as files. Without properly marking data object boundaries within the large backup data stream, a storage system will not be aware of individual data object boundaries that can be used as heuristics for segmentation. The segmentation boundaries tend to randomize across file boundaries, which would reduce read performance and virtual synthetic operation efficiency, because a backup file is often represented and accessed as a whole unit during backup and synthetic operations.

Figure 7:
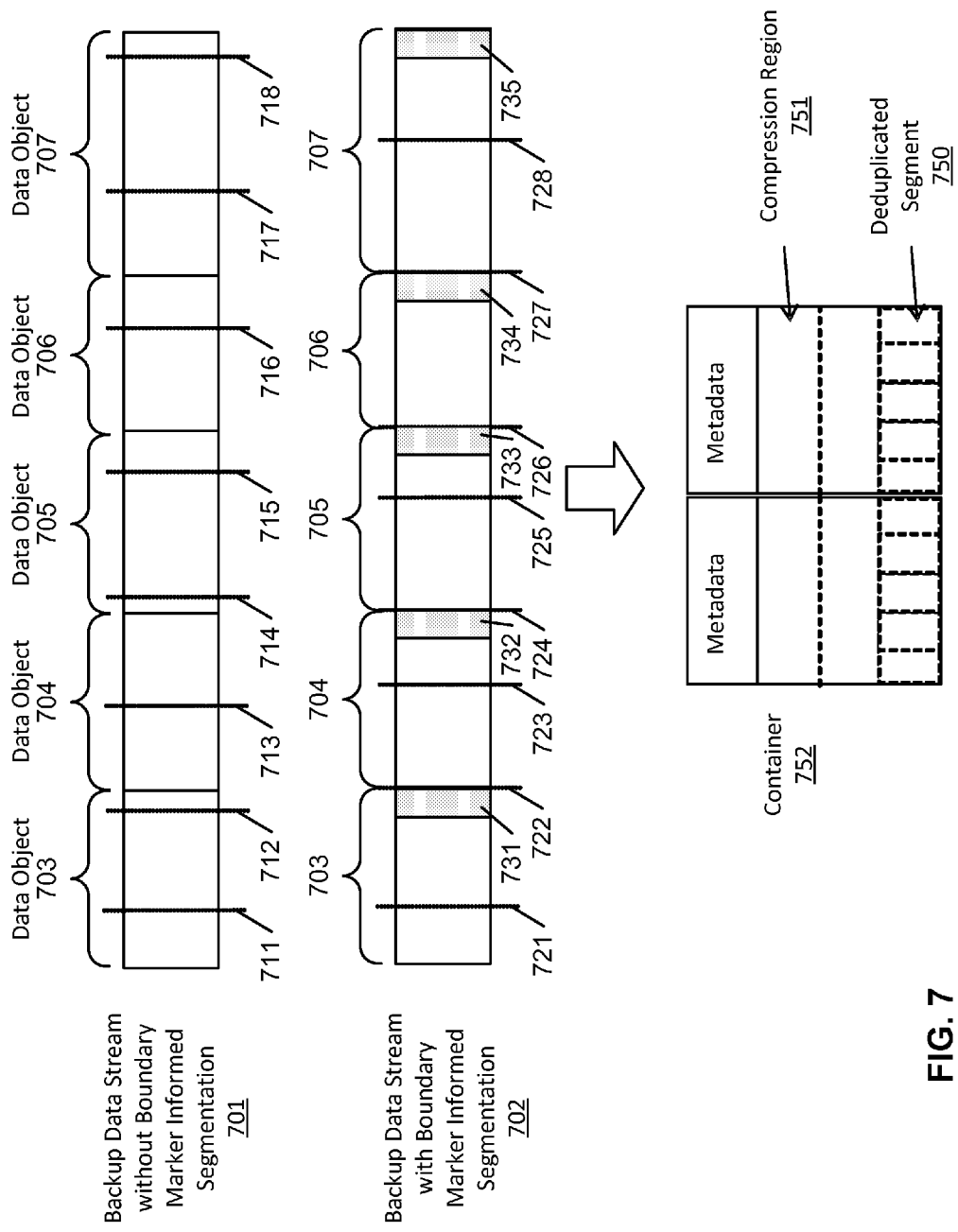
FIG. 7 is a block diagram illustrating a process for handling boundary markers according to one embodiment of the invention.

According to another embodiment, markers as shown in FIG. 2 can also be used as boundary markers that identify boundaries of data objects within a data stream. The data stream can be deduplicated in view of the boundaries of the data objects for a better deduplication efficiency. In one embodiment, boundary markers are inserted at natural data object boundaries into backup data stream at backup clients, which can be recognized by a storage system to improve performance and efficiency. Armed with such knowledge on data object layout boundaries, the storage system can produce internal segmentation boundaries that align with natural file boundaries FIG. 7 is a block diagram illustrating a process for handling boundary markers according to one embodiment of the invention. Referring to FIG. 7, when a storage system receives data stream 701 from a remote client for deduplication, the storage system performs a chunking operation to segment data stream 701 into chunks using a predetermined chunking algorithm. In this example, data stream 701 includes data objects 703-707 encapsulated therein, where a data object may represent a file or a group of files (e.g., directory of files). During chunking operations, a chunking unit of a deduplication storage engine (e.g., deduplication storage engine 107 of FIG. 1) parses data stream 701 to anchor, using a predetermined anchoring algorithm, multiple anchor points such as anchor points 711-718 indicating the boundaries of the chunks to be formed.

In one embodiment, such an anchoring algorithm may be a type-9 anchoring algorithm. A type-9 anchoring algorithm produces segments in sizes between a minimum of 4 kilobytes (KB) and a maximum of 12 KB with an average size of around 8 KB. It computes a rolling 32-bit exclusive OR (XOR) checksum up to 12 KB in data stream and selects the byte beyond 4 KB as an anchoring point where it produces a maximum checksum value.

In this example, without aware of data object boundaries, the anchoring algorithm produces anchoring points 711-718. As shown in FIG. 7, the chunk anchored by anchoring points 712 and 713 includes content of both data objects 703-704. Similarly, the chunks anchored between anchoring points 713-714, between anchoring points 715-716, and between anchoring points 716-717 also include content of multiple data objects. As described above, content of chunks associated with the same data object tends to be accessed as a whole. If a chunk includes content of multiple data objects, the efficiency of accessing the chunks associated with a particular data object will be significantly impacted.

With embedded boundary markers 731-735 as shown in data stream 702, the position of data object boundaries can be determined within data stream 702. As a result, when an anchoring point is determined using an existing anchoring algorithm such as type-9 anchoring algorithm, the boundary markers can be used to calculate a distance between the closest natural data object boundaries identified through boundary markers from the anchoring points. According to one embodiment, if such a distance is within a pre-defined threshold value, one of closest natural data object boundaries that best match other existing segmentation policies is chosen as an actual anchoring point for segmentation. The segmentation process proceeds with the rest of backup data stream starting from the newly established anchoring point. Referring to FIG. 7, with some of anchor points 721-728, such as anchor points 722, 724, 726, and 727 are selected to be aligned with data object boundaries identified by boundary markers 731-734, respectively. As a result, no chunk contains the content of multiple data objects or a number of chunks that contain content of multiple data objects can be reduced.

As segments (e.g., segment 750) are being generated through the segmentation process, they are being filtered for duplicate removal, then compressed and packed into containers for storage in compression unit called compression region or CR (e.g., compression region 751). Such containers (e.g., container 752) are appended to a container log, and each compression region contains a number of segments. In addition to alignment of anchoring points with natural data object boundaries during segmentation process, after segments have been filtered for removal of duplicates, segments belonging to a same file are to be packed into a single compression region and a single container for storage if there is no size constraint and other system policies permit. With such container packing optimization, many relatively small data can be retrieved with much higher probability that loading data only from a single container or a single compression region from a single container is sufficient, thus read performance can be improved.

Figure 8A:
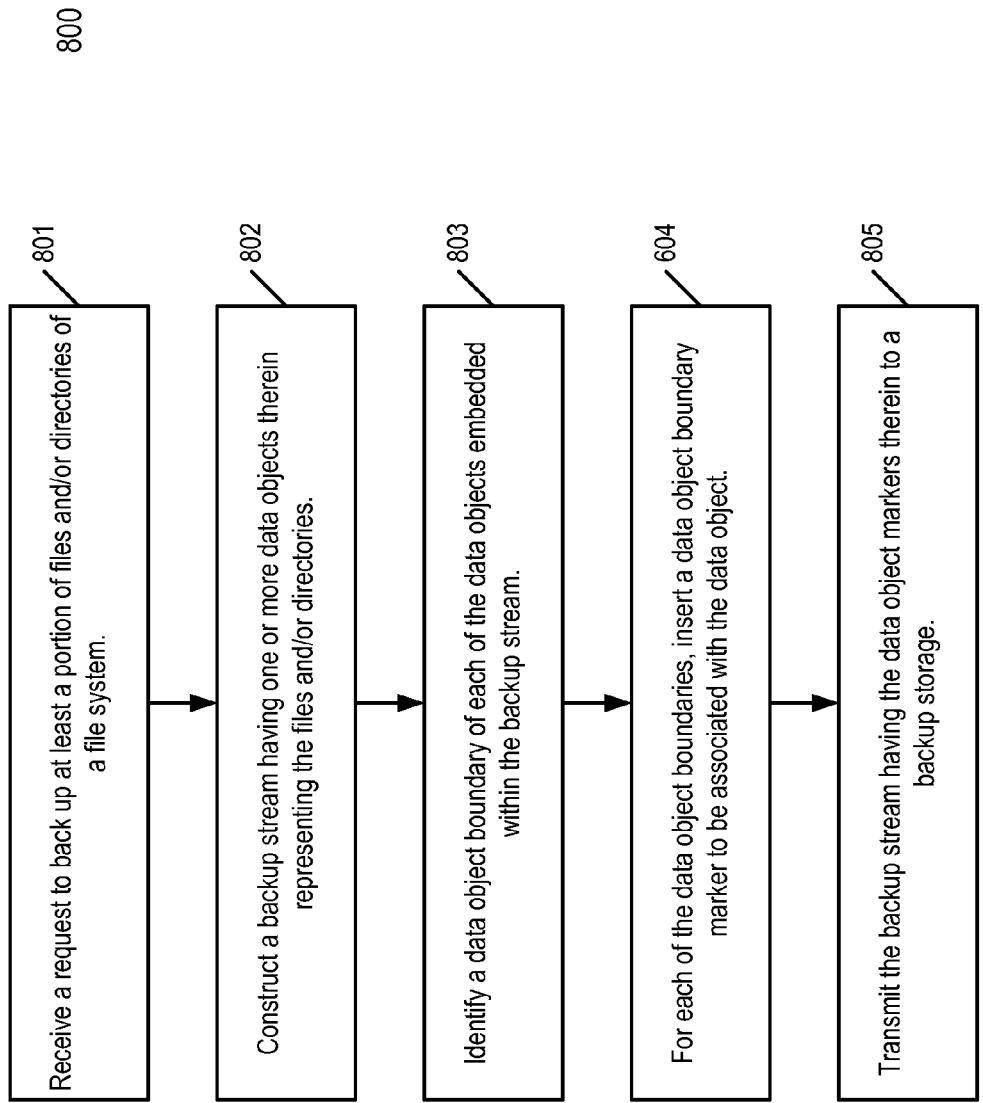
FIGS. 8A and 8B are flow diagrams illustrating a method for processing boundary markers according to certain embodiments of the invention.

FIG. 8A is a flow diagram illustrating a method for processing boundary markers according to one embodiment of the invention. Method 800 may be performed by client software 105 of FIG. 1. Referring to FIG. 8A, processing logic receives a request to back up at least a portion of files and/or directories of a file system. At block 802, a backup stream is constructed including one or more data objects representing the files and/or directories. At block 803, processing logic identifies a data object boundary for each of the data objects within the data stream. At block 804, for each of the data object boundaries, a boundary marker is inserted to identify the corresponding data object boundary. At block 805, the data stream having the boundary markers therein is then transmitted to a remote storage system.

Figure 8B:
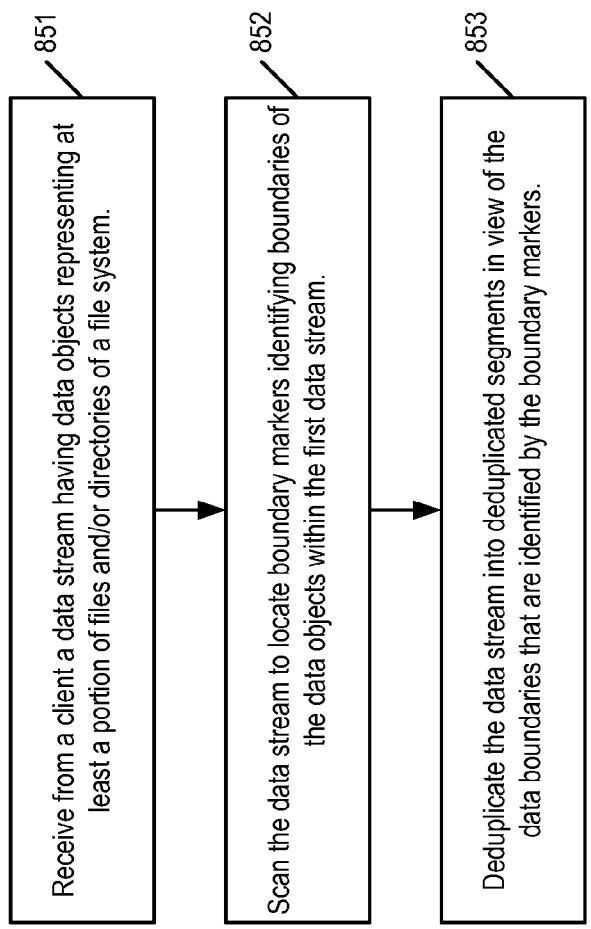

FIG. 8B is a flow diagram illustrating a method for processing boundary markers according to another embodiment of the invention. Method 850 may be performed by marker processing unit 115 of FIG. 1. Referring to FIG. 8B, at block 851, processing logic receives from a client a data stream having data objects representing at least a portion of files and/or directories of files of the client. At block 852, processing logic scans the data stream to recognize and locate boundary markers that identify boundaries of the data objects within the data stream. At block 853, the data stream is deduplicated in view of the data object boundaries that are identified by the boundary markers. Note that unlike checksum markers, boundary markers may not need to be removed from the data stream prior to deduplication. A boundary marker tends to be a constant with a small size (e.g., an integer). Such boundary markers do not have a big impact on the deduplication efficiency. Alternatively, the boundary markers can be removed prior to the deduplication.

FIG. 9 is a block diagram illustrating a deduplication storage system according to one embodiment of the invention. For example, deduplication storage system 1000 may be implemented as part of a deduplication storage system as described above, such as storage system 104 of FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients such as a client application or backup software located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 1010 may be organized into one or more volumes of Redundant Array of Inexpensive Disks (RAID). Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a CR of data chunks, or a container of one or more CRs. Fingerprints are mapped to a particular data object via metadata 1016, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace of a file system associated with the deduplication storage engine 1001. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for deduplicating data, comprising:
   receiving at a storage system over a network from a client a data stream having a sequence of a plurality of data objects, the data stream representing a file or a directory of one or more files of a file system associated with the client, wherein the data stream includes a plurality of boundary markers inserted by the client prior to being received at the storage system;
   scanning the data stream to recognize a plurality of boundary markers each being associated with each of the data objects, the boundary markers identifying boundaries of the data objects; and
   deduplicating the data stream into a plurality of deduplicated chunks in view of boundaries of the data objects marked by the boundary markers, wherein deduplicating the data stream comprises
      anchoring the data stream using a predetermined chunking algorithm to create a plurality of anchor points, each anchor point identifying a chunking boundary for deduplication;
      relocating at least one of the anchor points to a location that is identified by at least one boundary markers; and
      chunking the data stream into the deduplicated chunks based on the anchor points that include at least one relocated anchor point.

2. The method of claim 1, wherein the data stream is segmented and deduplicated in view of the boundaries of the data objects such that no deduplicated chunk includes content associated with multiple data objects.

3. The method of claim 1, wherein the data stream is segmented and deduplicated in view of the boundaries of the data objects such that a number of deduplicated chunks that include content associated with multiple data objects is reduced.

4. The method of claim 1, further comprising packing the deduplicated chunks that are associated with the same data object in a single compression region within a single storage container for storage.

5. A computer-implemented method for deduplicating data, comprising:
   receiving from a client a data stream having a sequence of a plurality of data objects, the data stream representing a file or a directory of one or more files of a file system associated with the client;
   scanning the data stream to recognize a plurality of boundary markers each being associated with each of the data objects, the boundary markers identifying boundaries of the data objects; and
   deduplicating the data stream into a plurality of deduplicated chunks in view of boundaries of the data objects, wherein deduplicating the data stream comprises
      anchoring the data stream using a predetermined chunking algorithm to create a plurality of anchor points, each anchor point identifying a chunking boundary for deduplication,
      relocating at least one of the anchor points to a location that is identified by at least one boundary marker, including
         determining a distance between a first anchor point and an adjacent data object boundary that is identified by a first boundary marker, and
         relocating the first anchor point to the adjacent data object boundary within the data stream if the distance is below a predetermined threshold, and
      chunking the data stream into the deduplicated chunks based on the anchor points that include at least one relocated anchor point.

6. The method of claim 5, further comprising adding a second anchor point at the adjacent data object boundary within the data stream if the distance is equal to or above the predetermined threshold.

7. A non-transitory machine-readable medium having instructions stored therein, which when executed by a processor, cause the processor to perform operations for deduplicating data, the operations comprising:
   receiving at a storage system over a network from a client a data stream having a sequence of a plurality of data objects, the data stream representing a file or a directory of one or more files of a file system associated with the client, wherein the data stream includes a plurality of boundary markers inserted by the client prior to being received at the storage system;
   scanning the data stream to recognize a plurality of boundary markers each being associated with each of the data objects, the boundary markers identifying boundaries of the data objects; and
   deduplicating the data stream into a plurality of deduplicated chunks in view of boundaries of the data objects marked by the boundary markers, wherein deduplicating the data stream comprises
      anchoring the data stream using a predetermined chunking algorithm to create a plurality of anchor points, each anchor point identifying a chunking boundary for deduplication;
      relocating at least one of the anchor points to a location that is identified by at least one boundary markers; and
      chunking the data stream into the deduplicated chunks based on the anchor points that include at least one relocated anchor point.

8. The non-transitory machine-readable medium of claim 7, wherein the data stream is segmented and deduplicated in view of the boundaries of the data objects such that no deduplicated chunk includes content associated with multiple data objects.

9. The non-transitory machine-readable medium of claim 7, wherein the data stream is segmented and deduplicated in view of the boundaries of the data objects such that a number of deduplicated chunks that include content associated with multiple data objects is reduced.

10. The non-transitory machine-readable medium of claim 7, wherein the operations further comprise packing the deduplicated chunks that are associated with the same data object in a single compression region within a single storage container for storage.

11. A non-transitory machine-readable medium having instructions stored therein, which when executed by a processor, cause the processor to perform operations for deduplicating data, the operations comprising:
   receiving from a client a data stream having a sequence of a plurality of data objects, the data stream representing a file or a directory of one or more files of a file system associated with the client;
   scanning the data stream to recognize a plurality of boundary markers each being associated with each of the data objects, the boundary markers identifying boundaries of the data objects; and
   deduplicating the data stream into a plurality of deduplicated chunks in view of boundaries of the data objects, wherein deduplicating the data stream comprises
      anchoring the data stream using a predetermined chunking algorithm to create a plurality of anchor points, each anchor point identifying a chunking boundary for deduplication,
      relocating at least one of the anchor points to a location that is identified by at least one boundary marker, including
         determining a distance between a first anchor point and an adjacent data object boundary that is identified by a first boundary marker, and
         relocating the first anchor point to the adjacent data object boundary within the data stream if the distance is below a predetermined threshold, and
      chunking the data stream into the deduplicated chunks based on the anchor points that include at least one relocated anchor point.

12. The non-transitory machine-readable medium of claim 11, wherein the operations further comprise adding a second anchor point at the adjacent data object boundary within the data stream if the distance is equal to or above the predetermined threshold.

13. A data processing system, comprising:
   a processor; and
   a memory storing instructions, which when executed from the memory, cause the processor to
      receive over a network from a client a data stream having a sequence of a plurality of data objects, the data stream representing a file or a directory of one or more files of a file system associated with the client, wherein the data stream includes a plurality of boundary markers inserted by the client prior to being received at the data processing system,
      scan the data stream to recognize a plurality of boundary markers each being associated with each of the data objects, the boundary markers identifying boundaries of the data objects, and
      deduplicate the data stream into a plurality of deduplicated chunks in view of boundaries of the data objects marked by the boundary markers, wherein deduplicating the data stream comprises
         anchoring the data stream using a predetermined chunking algorithm to create a plurality of anchor points, each anchor point identifying a chunking boundary for deduplication;
         relocating at least one of the anchor points to a location that is identified by at least one boundary markers; and
         chunking the data stream into the deduplicated chunks based on the anchor points that include at least one relocated anchor point.

14. The system of claim 13, wherein the data stream is segmented and deduplicated in view of the boundaries of the data objects such that no deduplicated chunk includes content associated with multiple data objects.

15. The system of claim 13, wherein the data stream is segmented and deduplicated in view of the boundaries of the data objects such that a number of deduplicated chunks that include content associated with multiple data objects is reduced.

16. A data processing system, comprising:
   a processor; and
   a memory storing instructions, which when executed from the memory, cause the processor to
      receive from a client a data stream having a sequence of a plurality of data objects, the data stream representing a file or a directory of one or more files of a file system associated with the client;
      scan the data stream to recognize a plurality of boundary markers each being associated with each of the data objects, the boundary markers identifying boundaries of the data objects; and
      deduplicate the data stream into a plurality of deduplicated chunks in view of boundaries of the data objects, wherein deduplicating the data stream comprises
         anchoring the data stream using a predetermined chunking algorithm to create a plurality of anchor points, each anchor point identifying a chunking boundary for deduplication,
         relocating at least one of the anchor points to a location that is identified by at least one boundary marker, including
            determining a distance between a first anchor point and an adjacent data object boundary that is identified by a first boundary marker, and
            relocating the first anchor point to the adjacent data object boundary within the data stream if the distance is below a predetermined threshold, and
         chunking the data stream into the deduplicated chunks based on the anchor points that include at least one relocated anchor point.

17. The system of claim 16, wherein a second anchor point is added at the adjacent data object boundary within the data stream if the distance is equal to or above the predetermined threshold.

18. The system of claim 17, wherein the deduplicated chunks that are associated with the same data object are packed in a single compression region within a single storage container for storage.

* * * * *